L. WOLF.
HYDROCARBON GAS CARTRIDGE.
APPLICATION FILED SEPT. 13, 1915.

1,265,574. Patented May 7, 1918.

Inventor:
LINUS WOLF,
By John N. Bruninga
His Attorney.

UNITED STATES PATENT OFFICE.

LINUS WOLF, OF CHICAGO HEIGHTS, ILLINOIS, ASSIGNOR TO THE THERMALENE COMPANY, OF CHICAGO HEIGHTS, ILLINOIS, A CORPORATION OF ILLINOIS.

HYDROCARBON-GAS CARTRIDGE.

1,265,574.  Specification of Letters Patent.  Patented May 7, 1918.

Original application filed June 16, 1915, Serial No. 34,511. Divided and this application filed September 13, 1915. Serial No. 50,372.

*To all whom it may concern:*

Be it known that I, LINUS WOLF, a subject of the Emperor of Germany, but having declared my intention of becoming a citizen of the United States, and residing at Chicago Heights, county of Cook, and State of Illinois, have invented a certain new and useful Improvement in Hydrocarbon-Gas Cartridges, of which the following is a specification.

This invention relates to gas producing bodies or cartridges, and more particularly, to cartridges containing a carbid. This application is a division of my copending application Serial No. 34,511.

One of the objects of this invention is to provide a composite gas producing body in which the heat evolved by the chemical reaction of one of the components is utilized to volatilize or gasify the other component.

Figure 1:
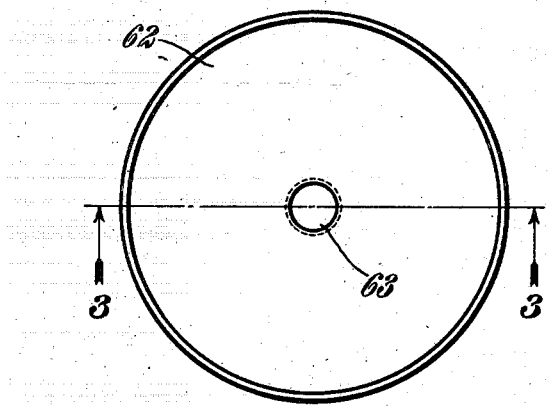
Figure 3:
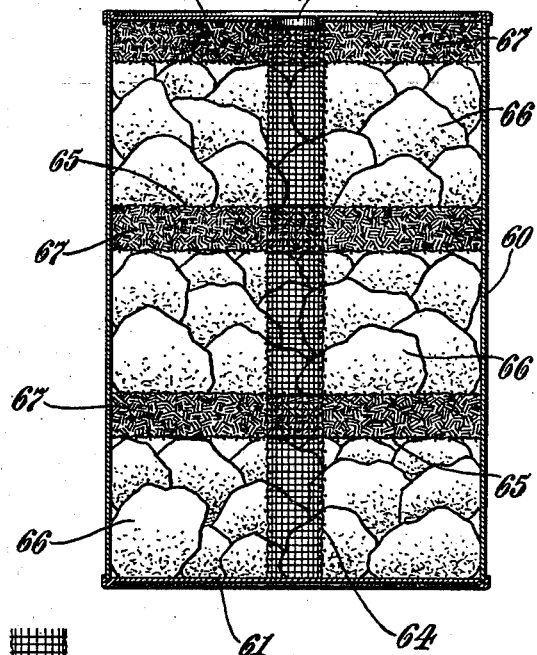
Figure 2:
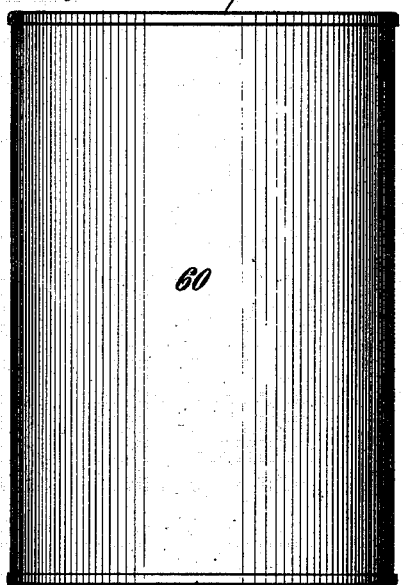
Figure 5:
Figure 4:
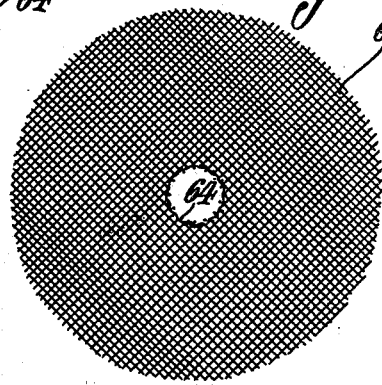

Further objects will appear from the detail description taken in connection with the accompanying drawing, in which, Figure 1 is a plan of the cartridge embodying this invention, Fig. 2 is a side elevation, Fig. 3 is a section on the line 3—3, Fig. 1, Fig. 4 is a detail f one of the separators, and Fig. 5 is a detail of the central tube.

In accordance with the method employed, as described in the application referred to, the heat evolved by the generation of acetylene from a carbid is absorbed at the point of generation to generate a gas, preferably an oil gas, which is combined with the acetylene to form the resultant gas. This utilization of heat at the point of generation serves to keep the temperature down so that radiation and absorption by the water is not necessarily depended upon. This result is obtained by providing a composite gas producing body or cartridge consisting of a carbid and a volatile hydrocarbon to be gasified, the hydrocarbon being preferably absorbed by a suitable absorbent, such as sawdust, arranged in alternate layers with the carbid. The combined gases thus formed are cooled together before issuing into the gas chamber, and this causes a removal of the impurities and a combination of the gases into a fixed homogenous gas.

The cartridge comprises a casing 60, which may be of sheet metal, paper, or any other suitable material, having ends 61 and 62. The end 62 is provided with a central perforation 63 which opens into a wire mesh or gauze cylinder 64. A series of spacers or separators 65, of wire mesh or gauze, are provided to separate the casing into a number of compartments. The cartridge casing receives alternate layers of a suitable carbid, such as calcium carbid 66, and an absorbent 67 impregnated with a suitable hydrocarbon, such as crude oil. The layers are separated by the wire mesh spacers 65. In practice the cartridge casing is filled first with a layer of carbid, then a spacer is inserted, then a compressed cake of sawdust impregnated with crude oil is inserted, then another spacer, etc., so that there will be a bottom layer of carbid and a top layer of sawdust impregnated with crude oil. Preferably only one end of the cartridge is perforated, and this perforation may be covered with a label, which can be removed or perforated before the cartridge is placed in the chamber.

The cartridge thus formed is adapted to be placed in the cartridge chamber of a generator, such as described in the application referred to, in which water is admitted from above and enters the cartridge through the aperture 64. As the water flows into the cartridge, the water will react with the bottom layer of calcium carbid so as to cause acetylene to be generated. This causes a rise in temperature in the cartridge, which causes the oil in the layer above the carbid to be vaporized. The mixture of acetylene and oil gas now travels upwardly through the cartridge and hence to a suitable holder.

In this process, as described in the application referred to, the heat evolved by the generation of the acetylene is utilized to gasify the crude oil held by the layer of sawdust. In this way, the heat generated is used and dissipated by the latent heat of the oil. The divisions of the carbid and oil cakes are so proportioned that the temperature is governed so as to cause only vaporization of the lighter oils, such as benzin, naphthalene, kerosene, etc. The temperature is not high enough to vaporize the tar oils, as these are heavy and give a deposit of lamp black. The heavy oils are, therefore, not utilized, but remain in the cartridge. The temperature in the cartridge, is, therefore, maintained between 200 and 400 degrees C., depending upon the rapidity of the use of the gas, and the amount of gas which is delivered and generated. It is not intended that an actual boiling shall take place, for, if the temperature is too high, not alone will there be a volatilization of the heavy oils, causing deposits in the pipes, but there will also be an increase in the impurities.

It is obvious that various changes may be made in details of construction without departing from the spirit of this invention. It is, therefore, to be understood that this invention is not to be limited to the specific details described and shown.

Having thus described the invention, what is claimed is:

1. A gas producing body comprising an acetylene-forming carbid, and a volatile component adapted and arranged to gasify by the heat evolved in the formation of the acetylene from the carbid.

2. A gas producing body comprising an acetylene-forming carbid, and a volatile hydrocarbon adapted and arranged to gasify by the heat evolved in the formation of the acetlyene from the carbid.

3. A gas producing body comprising an acetylene-forming carbid, and an oil adapted and arranged to gasify by the heat evolved in the formation of the acetylene from the carbid.

4. A gas producing body comprising a carbid, and a vehicle carrying a volatile gas-forming component.

5. A gas producing body comprising a carbid, and a vehicle carrying a hydrocarbon.

6. A gas producing body comprising a carbid, and an oil-carrying vehicle.

7. A gas producing body comprising alternate layers of a carbid and a volatile component.

8. A gas producing body comprising alternate layers of a carbid and a hydrocarbon component.

9. A gas producing body comprising alternate layers of a carbid and an oil carrying vehicle.

10. A gas producing body comprising alternate layers of a carbid and an absorbent carrying crude oil.

11. A gas producing body comprising separated portions of an acetylene-forming carbid and a volatile component, said portions being arranged so that the volatile component will be gasified by the heat evolved in the formation of the acetylene from the carbid.

12. A gas producing body comprising a carbid, a volatile hydrocarbon, and spacing means separating the carbid and the hydrocarbon, the components being adapted and arranged so that the hydrocarbon will be gasified by the heat evolved in the formation of the acetylene from the carbid.

In testimony whereof I affix my signature this 10th day of July, 1915.

LINUS WOLF.